(12) United States Patent
Awayssa

(10) Patent No.: US 12,611,648 B1
(45) Date of Patent: Apr. 28, 2026

(54) METHOD OF MAKING A DOPED BIOCHAR COMPOSITE AND USING THE SAME

(71) Applicant: United Arab Emirates University, Al Ain (AE)

(72) Inventor: Omar Awayssa, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 19/245,092

(22) Filed: Jun. 20, 2025

(51) Int. Cl.

| | |
|---|---|
| *B01J 20/20* | (2006.01) |
| *B01J 20/04* | (2006.01) |
| *B01J 20/08* | (2006.01) |
| *B01J 20/30* | (2006.01) |
| *C02F 1/28* | (2023.01) |
| *C02F 101/10* | (2006.01) |

(52) U.S. Cl.
CPC ............ *B01J 20/20* (2013.01); *B01J 20/041* (2013.01); *B01J 20/08* (2013.01); *B01J 20/3078* (2013.01); *B01J 20/3085* (2013.01); *C02F 1/288* (2013.01); *C02F 2101/105* (2013.01)

(58) Field of Classification Search
None
See application file for complete search history.

(56) References Cited

U.S. PATENT DOCUMENTS

2023/0372892 A1* 11/2023 Zhang ..................... B01J 20/06

FOREIGN PATENT DOCUMENTS

| CN | 118059815 A | * | 5/2024 | .............. C02F 1/283 |
|---|---|---|---|---|
| CN | 119746803 A | * | 4/2025 | |

OTHER PUBLICATIONS

Xie A green synthesis strategy toward calcined calcium-aluminum layered double hydroxide with sludge as aluminum source for efficient removal of phosphate from water (Year: 2024).*
Zhou (Sustainable phosphorus recovery from wastewater by layered double hydroxide/biochar composites for potential agricultural application (Year: 2025).*

(Continued)

*Primary Examiner* — Bradley R Spies
*Assistant Examiner* — Jeannie McDermott
(74) *Attorney, Agent, or Firm* — KNOBBE, MARTENS, OLSON & BEAR, LLP

(57) ABSTRACT

A method of preparing a Calcium-Aluminium-layered double oxide (CaAl-LDO)-doped biochar composite is provided. The method comprising providing a solution containing calcium nitrate and aluminium nitrate in a molar ratio of calcium nitrate to aluminium nitrate is 3:1, providing a pomace, providing an alkaline solution, mixing the pomace, the alkaline solution, and the solution containing calcium nitrate and aluminium nitrate, thereby to form a precipitate Calcium-Aluminium-layered double hydroxide (CaAL-LDH) on the pomace, and pyrolyzing or calcinating the mixture to prepare CaAL LDO-doped biochar composite. The pomace may be a natural pomace or pyrolyzed pomace. The (CaAl-LDO)-doped biochar composite may be used for removing phosphate-based impurities from water. The (CaAl-LDO)-doped biochar composite may adsorb up to 98% of phosphates from water.

11 Claims, 8 Drawing Sheets
(8 of 8 Drawing Sheet(s) Filed in Color)

(56)                    References Cited

OTHER PUBLICATIONS

Zhou et al. "Sustainable Phosphorus Recovery from Wastewater by Layered Double Hydroxide/Biochar Composites for Potential Agricultural Application" Industrial Crops & Products, *Elsevier 2025.*
Wang et al. "CaAl—Layered Double Hydroxides-Modified Biochar Composites Mitigate the Toxic Effects of Cu and Pb in Soil on Pea Seedlings", *Materials 2024*, 17, 2763.

* cited by examiner

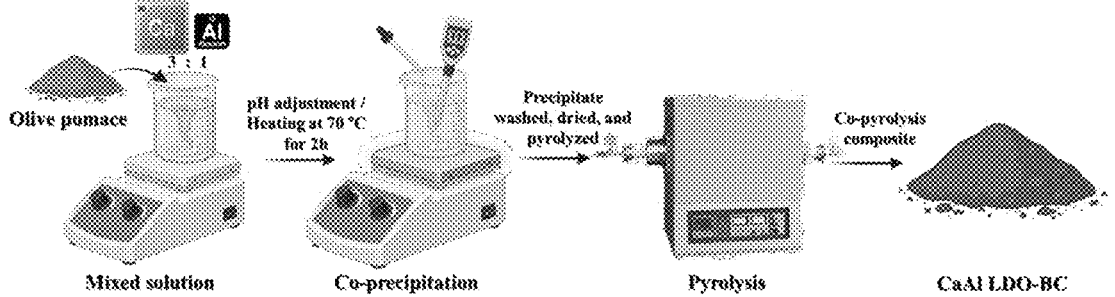
FIG. 1
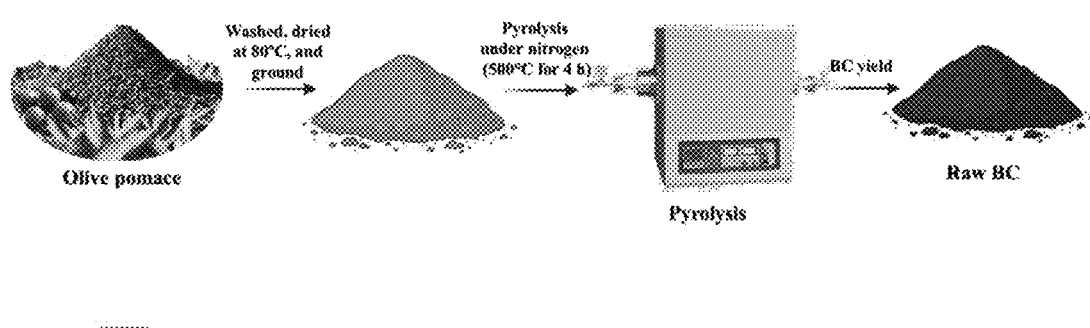
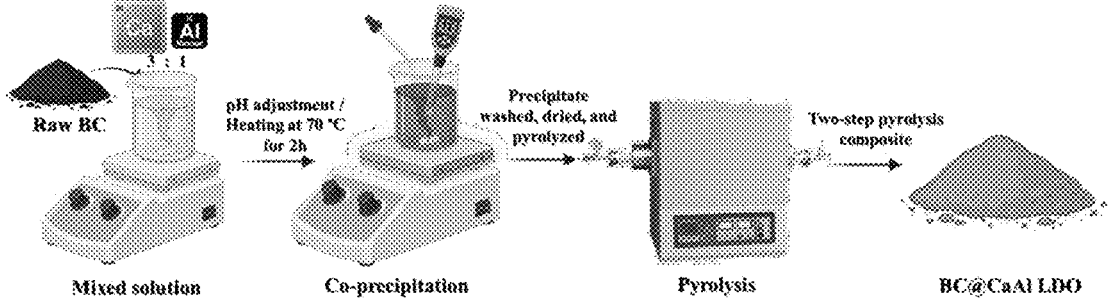
FIG. 2

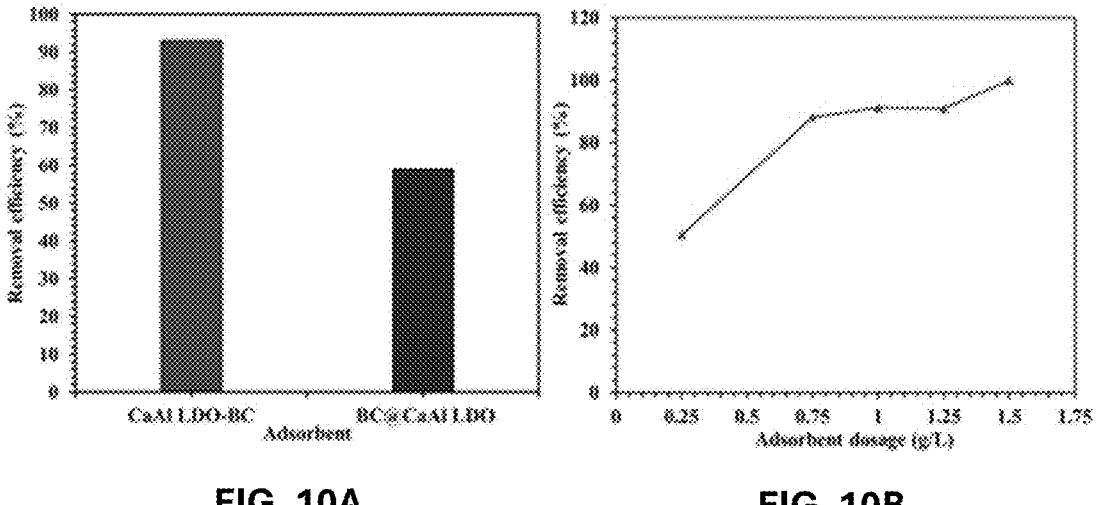
FIG. 10A                                    FIG. 10B
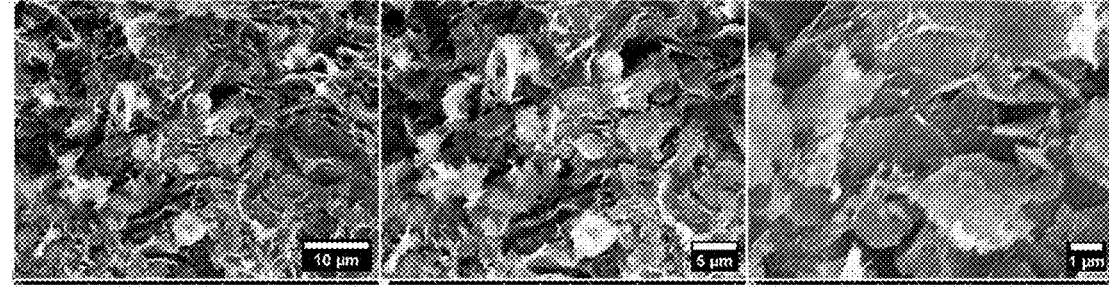
FIG. 11A

METHOD OF MAKING A DOPED BIOCHAR COMPOSITE AND USING THE SAME

FIELD OF INVENTION

The invention relates to a method of preparing a doped biochar composite. More specifically, the invention relates to a method of preparing a Calcium-Aluminium-layered double oxide (CaAl-LDO)-doped biochar composite. The invention also relates to a method of using the biochar composite for water treatment, and more specifically in the adsorption of phosphate-based impurities from water.

BACKGROUND

There are limited water resources available on the planet. With an increase in industrialization and human activities, the available water resources are reducing. Efforts are being taken globally to increase the quantity of available usable water. One route to increase the quantity of usable water is to recycle the wastewater.

For recycling of wastewater, there are different adsorbents available, both naturally occurring and laboratory synthesized. Examples of naturally occurring adsorbents include natural clay, bentonite, zeolite, etc. Examples of laboratory synthesized adsorbents include graphene/$SiO_2$, Chitosan/polyvinyl chloride, $Fe_2O_3$-$Al_2O_3$ nanocomposite fibers, Graphene oxide/carboxymethyl cellulose (CMC)/Fe, etc.

In the Mediterranean region, olive oil serves as a major component at least for preparing food and in cosmetics. Olive oil is prepared by extracting oil from an olive fruit. The pulpy material that remains after the extraction of the olive oil is known as the pomace. Olive pomace contains carbohydrates, lipids (remaining oil), phenols, and a number of inorganic compounds, cellulose, hemicellulose, and lignin as the main components; however, fat and protein are also present in significant quantities. Generally, this waste is used extensively as animal feed and also in bioethanol and methane production. Similar problems are encountered with the pomaces remaining from industries utilizing grapes, peanut, coconut and palm. The waste generated from these industries are in large quantities during a short period of time, leading to serious management problems.

There therefore exists a need for developing a method of using pomace, a waste product for remediation of water which may enable to tackle two environmental problems in one approach.

SUMMARY OF THE INVENTION

In one aspect of the invention, a method of preparing a Calcium-Aluminium-layered double oxide (CaAl-LDO)-doped biochar composite is provided. The method comprises providing a solution containing calcium nitrate and aluminium nitrate; providing a pomace; providing an alkaline solution; mixing the pomace, the alkaline solution, and the solution containing calcium nitrate and aluminium nitrate, thereby forming a precipitate Calcium-Aluminium-layered double hydroxide (CaAl-LDH) on the pomace; and pyrolyzing or calcinating the mixture to prepare CaAl LDO-doped biochar composite.

The method may further comprise separating the solution from the precipitate Calcium-Aluminium-layered double hydroxide (CaAl-LDH) on the pomace before pyrolyzing or calcinating the precipitate Calcium-Aluminium-layered double hydroxide (CaAL-LDH) on the pomace to form the CaAL LDO-doped biochar composite.

The molar ratio of calcium nitrate to aluminium nitrate may be 3:1.

The step of pyrolyzing or calcinating the mixture may be conducted in an inert atmosphere.

The pomace may be at least one of natural pomace and pyrolyzed pomace (biochar).

In an embodiment of the invention, the pomace used may be a natural pomace. The CaAL LDO-doped biochar composite formed using natural pomace is also called CaAl LDO-BC.

In another embodiment of the invention, the pomace used may be a pyrolyzed pomace. The CaAL LDO-doped biochar composite formed using natural pomace is also called BC@CaAl LDO.

The pyrolyzed pomace (also known as raw Biochar "raw BC") may be prepared by drying the pomace and heating the dried pomace at about 500° C. in an inert gas environment for about four hours, or until the pomace forms a biochar. When raw BC is mixed with calcium nitrate and aluminium nitrate, the resulted mixture is denoted as "BC@CaAl".

Non limiting examples of the pomace may include olive, grapes, peanut, coconut, and palm. In a preferred embodiment, the pomace is an olive pomace.

The alkaline solution may be a Sodium Hydroxide solution.

The phosphate adsorption efficiency of the Calcium-Aluminium-layered double oxide (CaAl-LDO)-doped biochar composite when natural pomace is used may be in the region of about 87% to about 98%.

The phosphate adsorption efficiency of the Calcium-Aluminium-layered double oxide (CaAl-LDO)-doped biochar composite when pyrolyzed pomace is used may the region of about 44% to about 97%.

In another aspect of the invention, a method of removing impurities from water is provided. The method comprises providing a Calcium-Aluminium-layered double oxide (CaAl-LDO)-doped biochar composite; and contacting the Calcium-Aluminium-layered double oxide (CaAl-LDO)-doped biochar composite with water for adsorbing impurities in the water.

The impurities are phosphate-based impurities. The CaAl-LDO-doped biochar composite is configured to adsorb the phosphate-based impurities in the range of from 43% to about 98%.

The water may be selected from any of usable water and wastewater.

Other aspects and embodiments of the invention will be apparent as will be shown in the detailed Description of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings illustrate non-limiting example embodiments of the invention FIG. 1 shows a cross section of a bird feeder according to one embodiment of the invention;

FIG. 2 shows a cross section of a bird feeder according to a second embodiment of the invention;

FIG. 10A illustrates the screening adsorption experiment using CaAl LDO-BC and BC@CaAl LDO. FIG. 10B illustrates the effect of CaAl LDO-BC dosage on P adsorption from wastewater;

FIG. 11A illustrates SEM micrographs of CaAl LDO-BC after P adsorption and FIG. 11B illustrates SEM micrographs of EDX mapping of CaAl LDO-BC after P adsorption.

DETAILED DESCRIPTION

Figure 3:
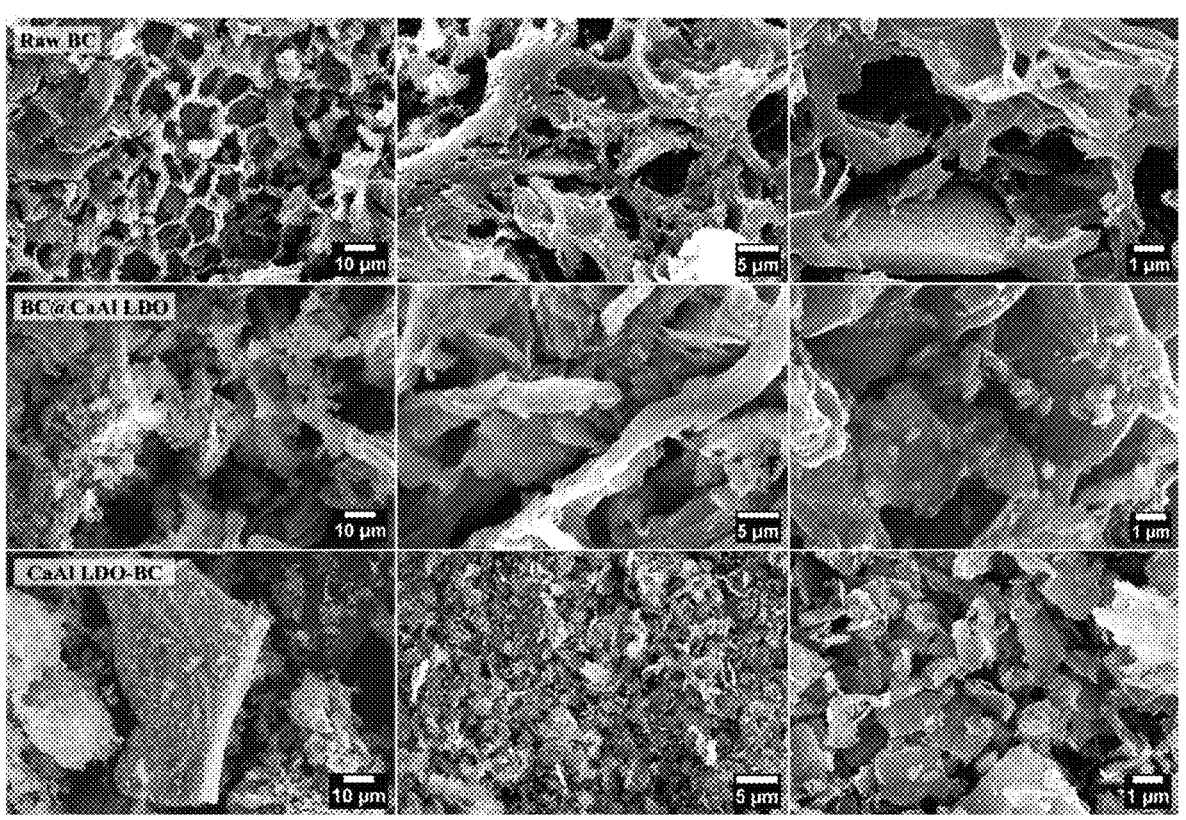
FIG. 3 shows the surface topography of raw Biochar (BC), BC@CaAl LDO, and CaAl LDO-BC were investigated using SEM-EDX analysis.

Throughout the following description, specific details are set forth in order to provide a more thorough understanding for a person skilled in the art. However, well known elements may not have been shown or described in detail to avoid unnecessarily obscuring the disclosure. The following description of examples of the invention is not intended to be exhaustive or to limit the system to the precise forms of any example embodiment. Accordingly, the description and drawings are to be regarded in an illustrative, rather than a restrictive sense.

The invention relates to a method of preparing a Calcium-Aluminium-layered double oxide (CaAl-LDO)-doped biochar composite by mixing a pomace, an alkaline solution, and a solution containing calcium nitrate and aluminium nitrate to form a precipitate Calcium-Aluminium-layered double hydroxide (CaAL-LDH) on the pomace; and pyrolyzing or calcinating the mixture to prepare CaAL LDO-doped biochar composite.

The pomace used in this process may be a natural pomace or a pyrolyzed pomace. Non limiting examples of the natural pomace may include pomace obtained from olive, grapes, peanut, coconut, and palm. In a preferred embodiment, the pomace is an olive pomace.

The method of preparing the Calcium-Aluminium-layered double oxide (CaAl-LDO)-doped biochar composite "BC/LDOs Composites" of the invention is described as follows:

Materials Used:

The invention is described using olive pomace as an example. Olive pomace (OP) may be obtained from an olive oil industry. Other materials used include analytical grade salts of aluminum nitrate nonahydrate (Sisco Research Laboratories, India, 98.5%), calcium nitrate tetrahydrate (Loba-Chemie, India, 98%), and sodium hydroxide pellets NaOH (Sigma-Aldrich, USA, ≥98%).

To conduct the adsorption experiments in synthetic water, a 2000 mg/L stock solution was prepared using potassium phosphate monobasic KH2PO4 (Eurolab, UK) in deionized (DI) water. The influence of coexisting anions and ionic strength was studied using humic acid (HA), sodium sulfate Na2SO4, sodium nitrate NaNO3, sodium chloride NaCl (Sigma-Aldrich, Germany, 99%), sodium fluoride NaF (Merck, Germany, 99.5%), and sodium bicarbonate NaHCO$_3$(Sisco Research Laboratories, India, 99%). Hydrochloric acid HCl (Merck Co., Germany, 37%) was used for pH adjustment and point of zero charge (PZC) determination. All chemicals were used in their original form without further purification.

Method of preparing the Calcium-Aluminium-layered double oxide (CaAl-LDO)-doped biochar composite:

FIG. 1 shows a schematic representation of a method of preparing Calcium-Aluminium-layered double oxide (CaAl-LDO)-doped biochar composite using the natural pomace. The method may also be called as co-pyrolysis method. The co-pyrolysis technique was applied by doping the ground olive pomace with CaAl LDH. The method comprises 7.08 g of Ca(NO3) 2·4H2O and 3.75 g of Al(NO3) 3. 9H2O with a Ca/Al molar ratio=3, was dissolved in 200 ml DI water and vigorously stirred. 2 g of the raw OP was then added and stirred for 1 hour. To induce precipitation, 2 M NaOH was added dropwise until the pH 11 was reached, followed by continuous stirring at 70° C. for 2 h. The mixture was left overnight. The resulting precipitate was separated via centrifugation using a Hitachi CR22N centrifuge. The precipitate was washed six times with DI water and dried in an oven at 100° C. for 24 h. The dried composite, designated as OP/CaAl LDH, was subjected to pyrolysis in a tubular furnace at 500° C. for 4 hours at a heating rate of 5° C./min. The resulting material was as Calcium-Aluminium-layered double oxide (CaAl-LDO)-doped biochar composite "CaAl LDO-BC".

FIG. 2 shows a schematic representation of a method of preparing Calcium-Aluminium-layered double oxide (CaAl-LDO)-doped biochar composite using a pyrolyzed pomace. The method may also be called a two-step pyrolysis method. The first step involves preparing a biochar (also known as raw Biochar or "raw BC"). In this method, the starting point OP was washed several times with DI water, dried at 80° C. for 48 h, and ground using Retsch Ultra Centrifugal Mill ZM 200. The resulting fine powder was placed in a tubular furnace at 500° C. for 4 h at a heating rate of 5° C./min under nitrogen to prepare a pyrolyzed pomace, raw BC.

The resulting raw BC was then doped with CaAl LDH using the co-precipitation procedure outlined as follows. 7.08 g of Ca(NO3) 2·4H2O and 3.75 g of Al(NO3) 3. 9H2O with a Ca/Al molar ratio=3, was dissolved in 200 mL DI water and vigorously stirred. 2 g of the raw or pyrolyzed Biochar was then added and stirred for 1 hour. To induce precipitation, 2 M NaOH was added dropwise until the pH 11 was reached, followed by continuous stirring at 70° C. for 2 h. The mixture was left overnight. The resulting precipitate was separated via centrifugation using a Hitachi CR22N centrifuge. The precipitate was washed six times with DI water and dried in an oven at 100° C. for 24 h. The dried composite, designated as OP/CaAl LDH, was subjected to pyrolysis in a tubular furnace at 500° C. for 4 hours at a heating rate of 5° C./min. The resulting material was as Calcium-Aluminium-layered double oxide (CaAl-LDO)-doped biochar composite "BC@CaAl LDO".

Characterization of BC/LDOs Composites

The pore size distribution, total pore volume ($v_{total}$), and Brunauer-Emmett-Teller (BET) surface area ($S_{BET}$) of the samples were analyzed using Barrett-Joyner-Halenda (BJH) and $N_2$ adsorption/desorption isotherms on a NOVAtouch LX2 analyzer at −196° C. Prior to analysis, the samples were degassed at 300° C. for 6 h. The morphology and elemental composition of raw BC, CaAl LDO-BC, and BC@CaAl LDO were characterized using Scanning Electron Microscopy (SEM, Thermo Scientific Apreo C) coupled with Energy Dispersive X-ray Spectroscopy (EDX). Fourier Transform Infrared Spectroscopy (FT-IR, JASCO FT/IR-6300) was employed to identify surface functional groups using the potassium bromide (KBr) pellet method, with spectra recorded over the wavenumber range of 4000-400 cm$^{-1}$. The crystalline structure of the adsorbents was determined by X-ray Diffraction (XRD) analysis using a D8 Advance diffractometer (Bruker, Germany) with a wavelength of λ=1.54056 Å. X-ray photoelectron spectroscopy (XPS) analysis was performed using the Nexsa G2 system (Thermo Scientific, UK) to investigate the chemical states of LDO/BC composite materials. The analysis utilized monochromatized Al—$K_d$ radiation (1486.6 eV) under ultra-high vacuum conditions (~10-9 mbar). Spectra were calibrated using the C 1s peak at 284.8 eV. Data acquisition was managed with Avantage V6.4.1 software, while Origin 2021b was used for data simulation and interpretation. The point of zero charge (PZC) of the adsorbents was determined via the pH drift method. For characterization of the CaAl LDO-BC composite, 10 mg of each adsorbent was dispersed in 10 mL of 0.1 M NaCl solution, adjusted to an initial pH between 2 and 12 using 0.1 M NaOH or HCl. The suspensions were stirred at 150 rpm for 72 hours, after which the final pH was measured to calculate the PZC. The results of the characterization are described below.

Method of Removing Impurities from Water

The method of removing impurities from water comprises contacting the Calcium-Aluminium-layered double oxide (CaAl-LDO)-doped biochar composite prepared as shown in FIG. 1 or FIG. 2 with water for adsorbing impurities in the water. The Calcium-Aluminium-layered double oxide (CaAl-LDO)-doped biochar composite is capable of adsorbing upto 98% of the phosphates from water.

The water used here may be usable-water or waste-water. Usable water may be any water of a high quality suitable for environmental enhancement, agricultural, industrial, municipal, and other beneficial consumptive or nonconsumptive uses. The wastewater may be any water from any combination of domestic, industrial, commercial or agricultural activities, surface runoff/storm water, and any sewer inflow or sewer infiltration.

To evaluate the removal efficiency of phosphorous (P) by raw BC, CaAl LDO-BC, and BC@CaAl LDO composites batch adsorption experiments were conducted. All experiments were performed using a Digital Orbital Shaker (DAI- HAN Scientific, SHO-2D, China). Anions analysis was conducted using Ion Chromatography Dionex ICS-6000 Thermo Scientific HPIC, UK. HACH DR3900 Lab VIS Spectrophotometer with PhosVer® 3 Phosphate reagent was employed too, particularly for samples with high electrical conductivity (EC) that were unsuitable for the IC instrument injection. The experimental conditions applied for both synthetic and wastewater samples are outlined in Table 1. The adsorption experiments were conducted with an agitation speed of 150 rpm and at room temperature (RT). The impact of coexisting anions on P removal was investigated by introducing a concentration of 100 mg/L of $SO_4^{2-}$, $NO_3^-$, $F^-$, $Cl^-$, $HCO_3^-$, and humic acid (HA) ions while maintaining a constant P concentration of 100 mg/L. Additionally, the influence of ionic strength on P removal efficiency was assessed using NaCl solutions at varying concentrations (0.001, 0.002, 0.01, 0.1, and 1 M), each containing 100 mg P/L. This approach evaluated the potential interference of ionic strength in the adsorption process. The removal efficiency and adsorption capacity of P ions by raw BC, CaAl LDO-BC, and BC@CaAl LDO were determined using Eq. 1 and Eq. 2 as follows:

$$R\% = \frac{C_o C_{eq}}{C_o} \times 100 \tag{1}$$

$$q_e = \frac{(C_o - C_{eq})}{S_o} \tag{2}$$

where R % is the P removal efficiency, $C_0$ and $C_{eq}$ are the P ions' initial and equilibrium concentration (mg/L); So is the adsorbent dosage (g/L); and $q_e$ is the equilibrium adsorption capacity of raw BC, CaAl LDO-BC, and BC@CaAl LDO (mg/g).

TABLE 1

Parameters and experimental conditions described for the adsorption studies.

| | Parameter | Range investigated | Other experimental settings |
|---|---|---|---|
| Synthetic water | Adsorbent dosage | 0.5-2.5 g/L | $[P]_i$ = 100 mg/L, $pH_i$ = 5, t = 24 h, RT. |
| | Initial P-concentration | 50-400 mg/L | $S_O$ = 1 g/L, $pH_i$ = 5, t = 24 h, RT. |
| | Contact time | 0-24 h min | $[P]_i$ = 100 mg/L, $pH_i$ = 5, $S_O$ = 1 g/L, RT. |
| | pH | 2.1-11.9 | $[P]_i$ = 150 mg/L, t = 24 h, $S_O$ = 0.5 g/L, RT. |
| | Coexisting anions | 100 mg/L | $[P]_i$ = 100 mg/L, $S_O$ = 1 g/L, $pH_i$ = 5, t = 24 h, RT. |
| | Ionic strength | 0.001-1M NaCl | $[P]_i$ = 100 mg/L, $S_O$ = 1 g/L, $pH_i$ = 5, t = 24 h, RT |
| | Temperature | 25-60° C. | $[P]_i$ = 150 mg/L, $pH_i$ = 5, $S_O$ = 0.5 g/L, t = 24 h. |
| Waste water | Screening | / | $[P]_i$ = 174.2 mg/L, $pH_i$ = 7.6, $S_O$ = 1.5 g/L, t = 1 h, RT. |
| | CaAl LDO-BC dosage | 0.2-1.5 g/L | $[P]_i$ = 174.2 mg/L, $pH_i$ = 7.6, t = 24 h, RT. |

Adsorption Kinetic

The removal kinetics of phosphorous "P" ions by CaAl LDO-BC were drawn to determine the rate-limiting mechanisms and adsorption capacity. The experimental data were fitted by the pseudo-first-order (PFO), pseudo-second-order (PSO), Elovich, and intra-particle diffusion models. The details of these models are presented in Table 2.

TABLE 2

Adsorption kinetic linearized equations.

| Kinetic models | Linearized equation | x vs. y |
|---|---|---|
| PFO | $\log(q_e - q_t) = \log(q_e) - (2.303)\frac{k1}{}t$ | t vs. $\log(q_e - q_t)$ |
| PSO | $\frac{t}{q_t} = \frac{1}{k_2 q_e{}^2} + \left(\frac{1}{q_e}\right)t$ | t vs. $\frac{t}{q_t}$ |
| Elovich | $q_t = \frac{1}{\beta}\ln(\alpha\beta) + \left(\frac{1}{\beta}\right)\ln(t)$ | $\ln(t)$ vs. $q_t$ |
| Intra-particle Diffusion | $q_t = k_{diff}\sqrt{t + c}$ | $\sqrt{t}$ vs. $q_t$ |

Adsorption Isotherm

The adsorption isotherm was evaluated by optimizing the adsorption data of CaAl LDO-BC and BC@CaAl LDO using the Langmuir, Freundlich, Redlich-Peterson (R-P), and Dubinin-Radushkevich (D-R) models. A detailed description of the model parameters is provided in Table 3. The isotherm data were analyzed and compared based on the minimization of the sum of square errors (SSE) (Eq. 3) using Excel Solver, alongside the determination coefficient ($R^2$) as a measure of fit.

$$SSE = \sum_{i=1}^{n} (q_{i(exp)} - q_{i(cal)})^2 \tag{3}$$

where $q_{i(exp)}$ and $q_{i(cal)}$ are the experimental and calculated adsorption capacity of the CaAl LDO-AC composite, respectively. The Langmuir adsorption model assumes monolayer adsorption on a surface with energetically uniform binding sites. An important parameter derived from the Langmuir model is the separation factor ($R_L$), which indicates the favorability of the adsorption process. The adsorption process is classified as favorable ($0 < R_L < 1$), unfavorable ($R_L = 1$), linear ($R_L = 1$), or irreversible ($R_L = 0$). The $R_L$ value can be calculated using Eq. 4 where $K_L$ is Langmuir constant:

$$R_L = \frac{1}{1 + K_L C_0} \tag{4}$$

The Freundlich isotherm model assumes multilayer adsorption on a heterogeneous surface and is particularly applicable to adsorption processes occurring on non-uniform sites. The Temkin isotherm model suggests that adsorption energy decreases linearly rather than exponentially throughout the adsorption process. In contrast, the R-P and Sips isotherm models integrate features of the Langmuir and Freundlich models into a 3-parameter framework. The R-P model combines both homogeneous and heterogeneous adsorption surfaces, whereas the Sips model addresses monolayer adsorption across both system types.

TABLE 3

Isotherm non-linearized equations.

| Isotherm Models | Non-linearized model | Parameters |
|---|---|---|
| Langmuir | $q_e = \frac{X_m K_L C_{eq}}{(1 + K_L C_{eq})}$ | $X_m$ (mg/g), the maximum P adsorption capacity. $K_L$ (L/mg), Langmuir consistent. |

TABLE 3-continued

Isotherm non-linearized equations.

| Isotherm Models | Non-linearized model | Parameters |
|---|---|---|
| Freundlich | $q_e = K_F C_{eq}^{\frac{1}{n_F}}$ | $K^F$ (mg/g/(mg/L)$^{1/n}$), the adsorption capacity coefficient. $\eta_F$, the adsorption intensity coefficient. |
| R-P | $q_e = \frac{K_R C_e}{1 + b_R C_{eq}^{n_R}}$ | $K_R$ (L/g) and $b_R$ (mg$^{-1}$) are constants of the R-P model. n, the model's exponent. |
| Temkin | $q_e = \frac{RT\ln(A_t C_e)}{b}$ | $A_t$ (L/mg), adsorption capacity coefficient, b, Temkin constant, R (8.314 J/mol/K), the ideal gas constant, and T (K), temperature. |
| Sips | $q_e = \frac{Q_s K_s C_e^{n_s}}{1 + K_s C_e^{n_s}}$ | $Q_s$ (L/g) and $K_s$ (L/mg) are Sips' constant, $n_s$, Sips exponent. |

Thermodynamics

Feasibility, and spontaneity of the P removal process, thermodynamic parameters, including enthalpy ($\Delta H^0$), entropy ($\lambda S^0$), and Gibbs free energy ($\Delta G^0$) were determined to understand the system better. The calculation of $\Delta G^0$ was performed using Eq. 5.

$$\Delta G^0 = -RT\ln K_d \tag{5}$$

where $K_d$ is the adsorption equilibrium constant that is obtained from Eq. 6:

$$K_d = \frac{q_e}{C_{eq}} \tag{6}$$

The values of $\lambda H^0$ and $\lambda S^0$ were determined to provide further insights into the adsorption process. $\lambda H^0$ indicates whether the adsorption is endothermic or exothermic, while $\lambda S^0$ reflects the degree of randomness of P at the solid-solution interface. These parameters were calculated from the slope and intercept of log ($K_d$) vs. (1/T) plot using Van't Hoff (Eq. 7):

$$\ln K_d = \left(\frac{\Delta S^0}{R}\right) - \left(\frac{\Delta H^0}{R}\right)\left(\frac{1}{T}\right) \tag{7}$$

Figure 4:
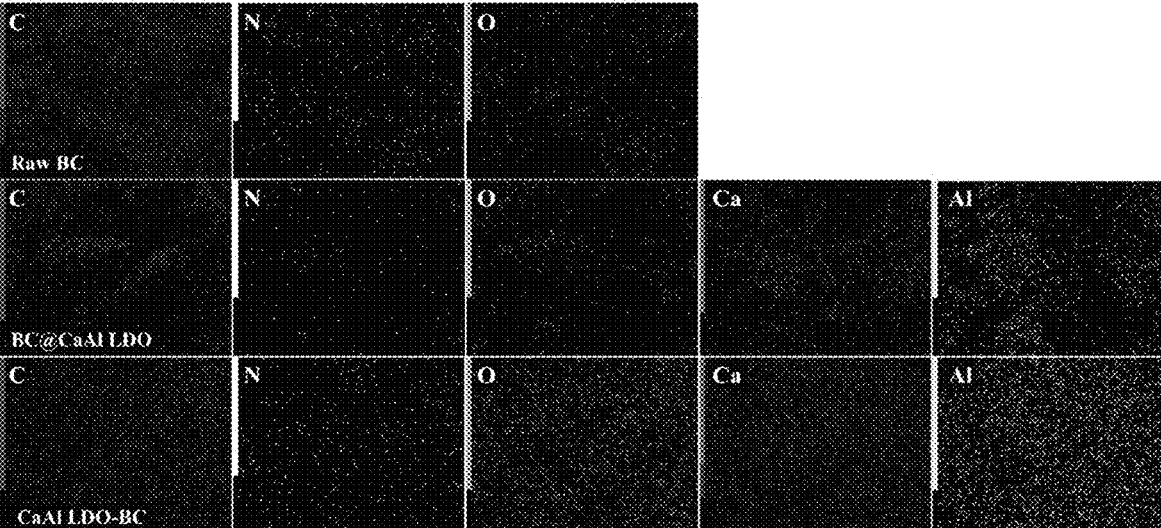
FIG. 4 shows the elemental mapping of raw BC, BC@CaAl LDO, and CaAl LDO-BC were investigated using SEM-EDX analysis.

Results of Material Characterization of BC@CaAl LDO
Morphological and Structural Properties The surface topography and elemental mapping of raw BC, BC@CaAl LDO, and CaAl LDO-BC were investigated using SEM-EDX analysis, as shown in FIG. 3 and FIG. 4, and the corresponding elemental composition data is summarized in Table 4. In FIG. 3, the SEM micrographs of raw BC revealed a highly porous and irregular surface structure with visible cavities, a characteristic of biochar derived from the pyrolysis process. In contrast, BC@CaAl LDO and CaAl LDO-BC displayed flake-like particles with lamellar structures embedded within the BC matrix. These features highlight the successful incorporation of CaAl LDO into the BC, which contributes to the enhancement of their textural properties and adsorption performance. These observations align with previous studies that reported similar morphological characteristics for CaAl LDH/BC composite. However, the CaAl LDO-BC composite exhibited more uniform and well-distributed LDO structures compared to BC@CaAl LDO, which possibly contributed to its enhanced efficiency in removing Pions.

The EDX analysis, shown in FIG. 4 and Table 4, provided detailed insights into the elemental composition and distribution on the surface of the materials. For raw BC, carbon was the predominant element (71.3 At. %), followed by nitrogen (19.1 At. %) and oxygen (8.9 At. %) which are typically found in biomass materials like olive pomace. Minor amounts of Ca(0.6 At. %) and Al (0.1 At. %) were detected, likely as impurities from the biomass precursor. In BC@CaAl LDO, the incorporation of Ca and Al into the BC matrix was evident, with Ca and Al concentrations increasing to 2.1 At. % and 1.7 At. %, respectively. Simultaneously, the oxygen content rose significantly to 21.4 At. %, indicating the formation of metal oxides during synthesis. For CaAl LDO-BC, the EDX analysis revealed a substantial increase in oxygen content to 36 At. %. The higher oxygen concentrations and the uniform elemental distribution in CaAl LDO-BC, as shown in the elemental mapping (FIG. 4), confirm efficient synthesis and homogenous dispersion of the CaAl LDO onto the BC following the co-pyrolysis method. These findings validate the enhanced surface functionality of the CaAl LDO-BC.

TABLE 4

SEM-EDX elemental composition for raw BC, BC@CaAl LDO, and CaAl LDO- BC.

| Material | Elemental composition (At. %) | | | | |
|---|---|---|---|---|---|
| | C | O | N | Ca | Al |
| Raw BC | 71.3 | 8.9 | 19.1 | 0.6 | 0.1 |
| BC@CaAl LDO | 57.3 | 21.4 | 17.5 | 2.1 | 1.7 |
| CaAl LDO-BC | 47.6 | 36 | 8.7 | 5.2 | 2.6 |

Figures 5A, 5B, 5C, 5D:
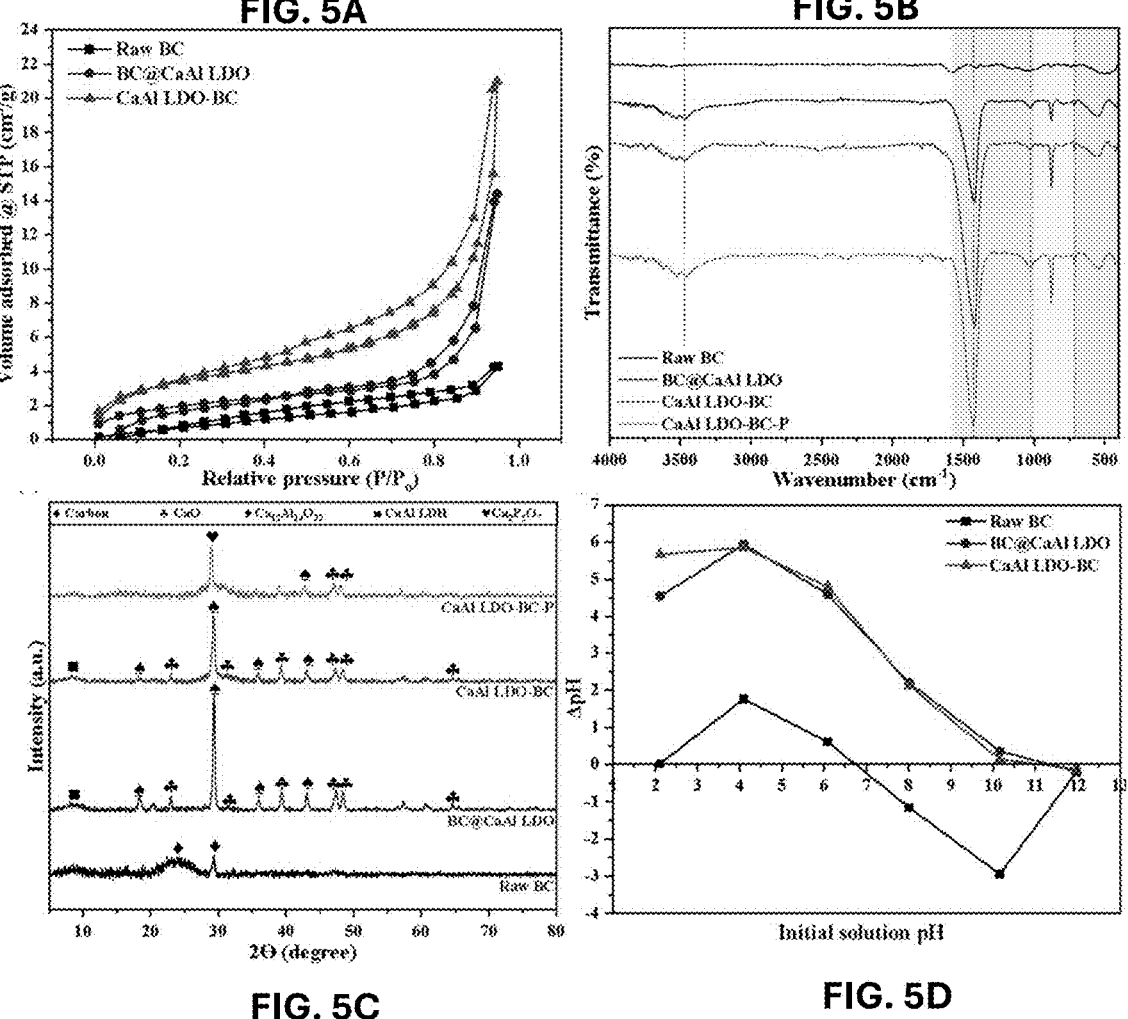
FIG. 5A shows N2 adsorption-desorption isotherm of raw BC, BC@CaAl, CaAl LDO-BC, and CaAl LDO—BC—P materials.
FIG. 5B shows FTIR spectra of raw BC, BC@CaAl, CaAl LDO-BC, and CaAl LDO—BC—P materials.
FIG. 5C shows XRD analysis of raw BC, BC@CaAl, CaAl LDO-BC, and CaAl LDO—BC—P materials
FIG. 5D shows PZC determination of raw BC, BC@CaAl, CaAl LDO-BC, and CaAl LDO—BC—P materials using the pH drift method.

The $N_2$ adsorption/desorption isotherms of raw BC, BC@CaAl LDO, and CaAl LDO-BC are depicted in FIG. 5A, and their textural properties including BET-specific surface area ($S_{BET}$), total pore volume ($v_{total}$), average pore diameter ($\overline{D}_p$), and average pore volume ($\overline{V}_p$) are tabulated in Table 5. Based on the IUPAC classification of isotherms, the raw BC, BC@CaAl LDO, and CaAl LDO-BC composites displayed type IV adsorption isotherm, featuring H4 and H3 hysteresis loops. This indicates that the materials possess characteristic mesoporous structures with irregular and interconnected pore networks, reflecting their complex porosity. The inflection points within the hysteresis loops of the composite materials were observed at relative pressures (P/Po) ranging from 0.3 to 0.9, indicating the presence of constant hexagonal structures. Table 4 reveals that the raw BC has a low specific surface area of 4.69 m²/g with $\overline{D}_p$ of 7.74 nm and $\overline{V}_p$ of 0.7 cm³/g. Similar low surface areas have been reported in recent studies, such as olive pomace biochar (OPB), which exhibited an $S_{BET}$ of 1.076 m²/g. This limited surface area could be attributed to several factors including the intrinsic properties of the BC source, which may undergo mechanical processing (e.g., pressing), as well as factors such as pyrolysis temperature and residence time. Upon doping raw BC with CaAl LDO, the $S_{BET}$ increased to 6.87 and 11.75 m²/g for BC@CaAl LDO and CaAl LDO-BC, respectively. This enhancement is primarily attributed to the incorporation of CaAl LDO, which tends to form flake-like structures that increase surface area and create additional adsorption sites, as confirmed in SEM images. However, the highest surface area observed in CaAl LDO-BC can be explained by the effective pyrolysis process. In the co-pyrolysis method, the introduction of Ca and Al salts into the raw OP biomass can facilitate the development of pores during the pyrolysis process. Hence, the embedded metal precipitates inhibit the agglomeration of adjacent carbon atoms, thereby enhancing the surface area.

TABLE 5

Surface area and pore structure parameters of raw BC, BC@CaAl LDO, and CaAl LDO-BC composites.

| Adsorbent | $S_{BET}$ (m²/g) | $\overline{D}_p$ (nm) | $\overline{V}_p$ (cm³/g) |
|---|---|---|---|
| Raw BC | 4.69 | 7.74 | 0.70 |
| BC@CaAl LDO | 6.87 | 13 | 1.94 |
| CaAl LDO-BC | 11.75 | 11.08 | 3.18 |

FTIR Analysis

The FTIR spectra in FIG. 5B provide insights into the functional groups present in raw BC, BC@CaAl LDO, and CaAl LDO-BC. The raw BC spectrum revealed characteristic peaks indicative of its structure, including the broad band with very low intensity around 3549 and 1589 cm⁻¹ corresponding to O—H stretching and bending vibrations, which are associated with hydroxyl groups and moisture. The peaks at 1410 and 1033 cm⁻¹ are assigned to the antisymmetric bending and stretching vibrations of O═C—O and C—O stretching vibrations, respectively. Upon doping with CaAl LDO, the O—H band was shifted slightly for both composites to 3469 cm⁻¹ and its intensity increased dramatically which is attributed to the interlayer and surface adsorbed water molecules. Additionally, a strong stretching bond at 1420 cm⁻¹ corresponding to the N—O functional group was observed, depicting the presence of $NO_3^-$ interlayer anion. The peaks below 800 cm 1 are assigned to the Al—O symmetrical stretching and bending vibrations, indicating the presence of Al—O tetrahedrons (AIO4). While peaks between 1000 cm 1 and 800 cm⁻¹ represent Ca—O lattice vibrations and Ca—O—H bending, which confirms the successful formation of metal oxides during the pyrolysis process. These metal-oxygen bonds in the CaAl LDO structure and oxygen-containing functional groups on the BC surface play a crucial role in P removal, serving as active adsorption sites in the BC/LDO composites.

XRD Analysis

The data depicted in FIG. 5C represents the XRD patterns of raw BC, BC@CaAl LDO, and CaAl LDO-BC. The raw BC exhibited a broad peak within the 20 range of 20.6° to 27.7°, signifying the amorphous state of the material and the presence of graphitic carbon. This graphitic phase primarily results from the combustion of biomass constituents such as lignin and hemicellulose. Additionally, the sharp peak observed at 29.3° suggests residual inorganic impurities such as calcite (JCPDS 47-1743). In contrast, BC@CaAl LDO and CaAl LDO-BC XRD spectra revealed significant changes. The characteristic (003) and (006) diffraction planes, typically associated with the CaAl LDH structure (JCPDS #870493)), were absent. This disappearance indicates the collapse of the hydrotalcite-like structure during the pyrolysis process at 500° C. The pyrolysis transformation results in the formation of bimetallic oxides such as calcium oxide (CaO) and mayenite ($Ca_{12}Al_{14}O_{33}$). The characteristic reflections for CaO appear at 20 values of 22.9°, 31.4°, 39.3, 47.5, 48.4, and 64.7°, while $Ca_{12}Al_{14}O_{33}$ exhibited distinct peaks at 18.3°, 29.4°, 35.9°, and 43.2°. It can be noticed that a small peak with very low intensity is present at 8.9° indicating the presence of some LDH structure residues. These results confirm that the pyrolysis process effectively transformed the LDH into an LDO structure, regardless of whether raw OP or OP-derived BC was used as the carbon support. This indicates the successful integration of CaAl LDO into the BC framework under both synthesis protocols.

PZC Determination

The PZC of raw BC, BC@CaAl LDO, and CaAl LDO-BC was determined using the pH drift method, as illustrated in FIG. 5D. The raw BC exhibited a pHPZC at approximately pH 6.8, indicating that its surface charge becomes negative at pH values higher than 7. After the incorporation of CaAl LDO, the pHPZC values increased significantly to around 11.2 for BC@CaAl LDO and 11.5 for CaAl LDO-BC. This notable shift suggests that the modified materials possess a positively charged surface over a broader pH range, which enhances the surface properties of the composite, facilitating electrostatic interactions with anionic contaminants such as P ions.

Batch Adsorption Studies

Figures 6A, 6B, 6C, 6D:
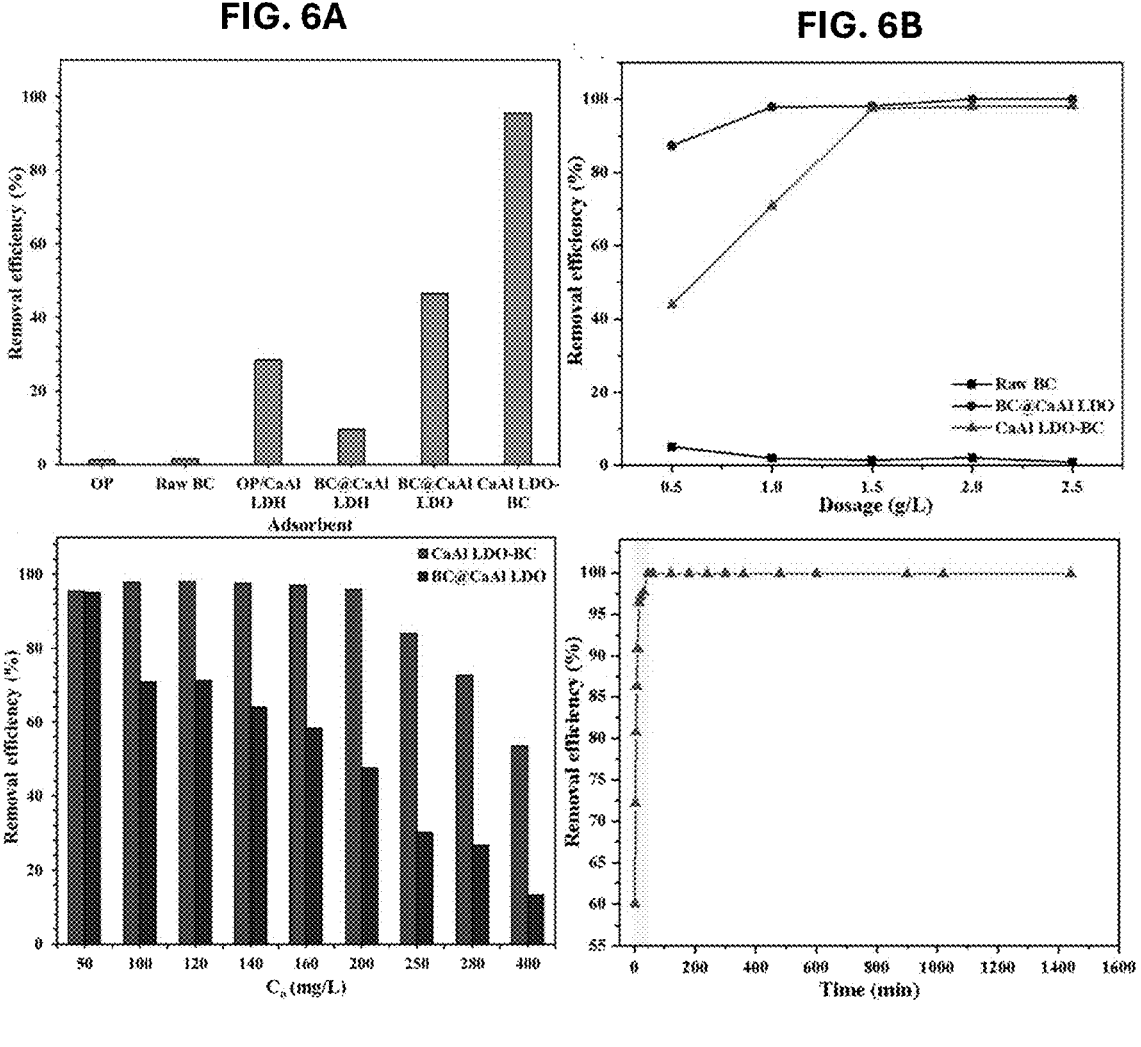
FIG. 6A illustrates the screening experiment on the effect of adsorbent type on removal efficiency.
FIG. 6B illustrates the effect of BC, BC@CaAl LDO, and CaAl LDO-BC dosage on removal efficiency.
FIG. 6C illustrates the effect of P initial concentration on phosphorous P removal efficiency.
FIG. 6D illustrates the effect of contact time using CaAl LDO-BC on P adsorption.

Preliminary adsorption experiments were conducted to assess the performance of OP, BC, OP/CaAl LDH, BC/CaAl LDH, BC@CaAl LDO, and CaAl LDO-BC, as depicted in FIG. 6A. Both raw OP and BC exhibited minimal removal efficiency with less than 2%, highlighting their limited capability for P adsorption. Upon doping the raw adsorbents with CaAl LDH, the removal efficiency was slightly improved with 29.8 and 9.5% removal efficiency using OP/CaAl LDH and BC/CaAl LDH, respectively. However, the performance of the materials further improved with the transformation of LDH into its calcined phase, LDO. The BC@CaAl LDO composite demonstrated an increase in removal efficiency, reaching 46.4%. This improvement can be attributed to the increased surface area and enhanced adsorption properties associated with the LDO phase. The best performance was observed for CaAl LDO-BC, achieving an impressive removal efficiency of approximately 95.6%. This exceptional efficiency underscores the synergistic effect of integrating the LDO phase and the co-pyrolysis method, resulting in optimal adsorption capabilities. Similar performance was reported comparing the non-calcined and calcined Mg/Fe LDH, where calcination significantly improved P adsorption performance.

Effect of Adsorbent Dosage

The influence of adsorbent dosage for the removal of P ions from synthetic water was examined, as illustrated in FIG. 6B. The removal efficiency of raw BC remained minimal across all dosages, ranging below 5.1% with an adsorption capacity of a maximum of 10.8 mg/g, demonstrating its limited ability to remove P. In contrast, BC@CaAl LDO and CaAl LDO-BC composites exhibited significant enhancement in P adsorption performance. An increment in BC@CaAl LDO dosage resulted in an increase in the removal efficiency of 43.8, 70.9, and 97.5% at 0.5, 1, and 1.5 g/L, respectively. Further increases in dosage did not significantly improve the adsorption performance. The best removal was achieved by the CaAl LDO-BC composite.

With merely 0.5 g/L dosage, 87.3% was the removal of P with an adsorption capacity of 183.9 mg/g. By increasing the dosage to 1 g/L, the removal increased to an approximately complete removal of 97.9%. The superior performance of BC/LDO composites can be attributed to their enhanced surface properties, including improved anion exchange capacity, surface area, and the presence of active adsorption sites facilitated by the incorporation of CaAl LDO. While the higher efficiency of CaAl LDO-BC, compared to BC@CaAl LDO, can be explained by differences in synthesis methods, which resulted in variations in surface area, porosity, and material structure. Therefore, it can be concluded that CaAl LDO-BC exhibits the highest performance among the evaluated adsorbents, with an optimal dosage of 1 g/L balancing efficiency and material usage.

Effect of Initial $PO_4^{3-}$ Concentration

The influence of the initial P concentration (50-400 mg/L) on the removal efficiencies of both CaAl LDO-BC and BC@CaAl LDO adsorbents is illustrated in FIG. 6C. At an initial concentration of 50 mg/L, both materials exhibited their highest removal efficiencies, achieving approximately 96% and 95% for CaAl LDO-BC and BC@CaAl LDO, respectively. However, as the initial P concentration increased, CaAl LDO-BC consistently outperformed BC@CaAl LDO, maintaining removal efficiencies above 95% up to a concentration of 200 mg/L. Beyond this concentration, a gradual decline was observed, with efficiencies decreasing to 84%, 72.7%, and 53.4% at concentrations of 250, 280, and 300 mg/L, respectively. In contrast, BC@CaAl LDO showed a more pronounced decline in performance, with removal efficiency dropping from 95.1% at 50 mg/L to 70.8% at 100 mg/L and further decreasing to merely 13.2% at 400 mg/L. This significant difference underscores the superior adsorption capacity of CaAl LDO-BC for P removal. The declining trend for both composites is attributed to the saturation of active adsorption sites in the composite as P ion concentrations increase. Higher ion concentrations result in greater surface coverage, progressively depleting the available active sites and thereby reducing removal efficiency. The difference in performance between BC@CaAl LDO and CaAl LDO-BC can be strongly linked to the structural variations introduced by the synthesis methods. Notably, CaAl LDO-BC exhibited a higher surface area (11.75 m²/g), 1.7 times greater than BC@CaAl LDO (6.87 m²/g), and a higher oxygen content (36 At. %) compared to BC@CaAl LDO (21.4%). A similar study reported such performance differences using Ni/Fe-LDH-modified biochar. Based on the previous findings, CaAl LDO-BC is confirmed to outperform BC@CaAl LDO, presenting superior adsorption efficiency.

Effect of Contact Time

The effect of contact time presented in FIG. 6D evaluates the adsorption performance of CaAl LDO-BC for P ions over time. The results indicate that the composite exhibited a rapid uptake rate, with a steep increase in the adsorption efficiency, reaching equilibrium within approximately 30 min. During this initial phase, 97.7% removal efficiency of P was achieved with an adsorption capacity of 102.9 mg/g, highlighting the material's strong affinity and high availability of active sites for P adsorption. At this stage, the interaction between P ions and CaAl LDO-BC composite is easier as more adsorption sites are available. The adsorption rate is initially high due to the strong concentration gradient at the solid-liquid interface. Over time, it decreases as solute diffusion into the adsorbent slows down. Beyond this point, the adsorption rate further declines, and the system eventually reaches complete removal, where the adsorption curve plateaus. The results highlight the efficiency of CaAl LDO-BC in rapidly adsorbing phosphorous ions, making it a promising material for applications requiring quick water treatment.

Effect of pH

Figures 7A, 7B, 7C, 7D, 8A, 8B:
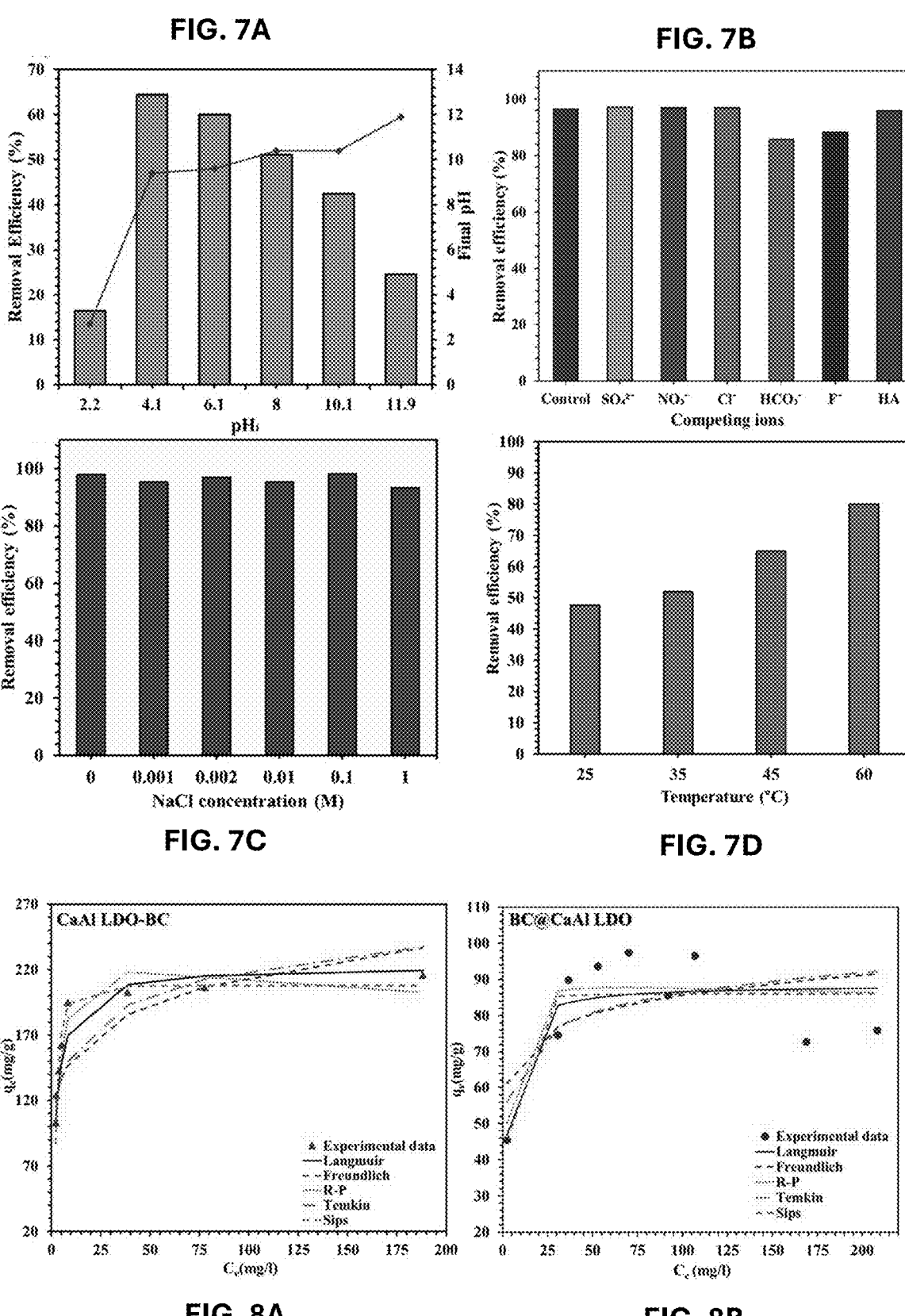
FIG. 7A Illustrates the effect of initial solution pH on phosphate removal efficiency.
FIG. 7B Illustrates the effect of coexisting ions on phosphate removal efficiency.
FIG. 7C Illustrates the effect of ionic strength on phosphate removal efficiency, and FIG. 7D Illustrates the effect of temperature on phosphate removal efficiency.
FIG. 8A illustrates the adsorption isotherm of P$^-$ by CaAl LDO-BC and their fitted models.
FIG. 8B illustrates the adsorption isotherm of P$^-$ by BC@CaAl LDO composites and their fitted models;.

The initial solution pH significantly influences the adsorption efficiency of P onto CaAl LDO-BC, because it affects both the surface charge of the adsorbent and the speciation of P ions in the solution. FIG. 7A illustrates the P removal efficiency as a function of initial solution pH, varying the pH from 2.2 to 11.9. More specially, FIG. 7A illustrates the effect of initial solution pH, $[P]_i=150$ mg/L, $t=24$ h, $So=0.5$ g/L, RT on P removal efficiency. The removal efficiency was the lowest at pH 2.2 of 6.4% and increased to a maximum of 64.4% at pH 4.1. Beyond this point, removal efficiency decreased gradually, reaching 24.6% at pH 11.9. The observed trend can be attributed to the dissociation behavior of P species and the surface charge characteristics of CaAl LDO-BC. Phosphate exists in different forms depending on the pH value, the $H3PO_4$ is dominant under strongly acidic conditions at pH<2.1, $H_2PO_4^-$ is dominant between pH 2.1 and 7.2, $HPO_4^{2-}$ between pH 7.2 and 12.3, and $PO_4^{3-}$ at pH>12.33. At pH 2.2, the dominant species is $H_3PO_4$ which is electrically neutral and exhibits minimal interaction with the positively charged surface of CaAl LDO-BC, which in turn results in poor removal efficiency. As the pH increases to 4.1, $H_2PO_4^-$ becomes the predominant species. The positively charged surface of CaAl LDO-BC (pHpzc=11.5) enables strong electrostatic attraction, leading to the highest removal efficiency. At higher pH values, the gradual shift in phosphate speciation to $HPO_4^{2-}$ and $PO_3^-$, coupled with increasing competition from OH-ions for adsorption sites, reduces the electrostatic interaction, resulting in the observed decline in removal efficiency.

The final solution pH values, also presented in FIG. 7A, exhibited an increase across most initial pH conditions, except at pH 11.9 where no change was observed. For instance, at an initial pH of 2.2, the final pH rose to 2.7, while at an initial pH of 4.1, the final pH increased substantially to 9.4. This increase in pH can be attributed to electrostatic interactions between the phosphate ions and the adsorbent surface, which likely involves deprotonation of functional groups on the CaAl LDO-BC surface. Despite the observed decline in removal efficiency at higher pH, it is noteworthy that the removal experiment was conducted at an initial P concentration of 150 mg/L, and the removal remained above 50% at pH 8.0. This finding demonstrates the efficiency of CaAl LDO-BC in removing phosphate ions under a range of pH conditions.

Effect of Coexisting Ions

The selectivity of CaAl LDO-BC toward phosphate removal was evaluated in the presence of common co-existing ions, including $F^-$, $Cl^-$, $NO_3^-$, $SO_4^{2-}$, and $HCO_3^-$. The reaction conditions are: $[P]i=100$ mg/L, $[Ions]i=100$ mg/L, $So=1$ g/L, pHi=5, $t=24$ hr at room temperature. Humic acid (HA) was also tested to assess the impact of organic matter commonly found in wastewater samples. The experiments were conducted using 100 mg/L of P and 100 mg/L of each co-existing ion or HA. The results, presented in FIG. 7B, demonstrated the remarkable selectivity of CaAl LDO-BC for P removal, with efficiencies exceeding 95% in the presence of $Cl^-$, $NO_3^-$, $SO_4^{2-}$, and HA. These findings suggest that the presence of these ions has negligible influence on the phosphate adsorption process, highlighting the selectivity of the adsorbent under diverse water chemistries.

However, the removal efficiency slightly decreased to 88.2% and 85.8% in the presence of $F^-$ and $HCO_3^-$, respectively. The decrease in removal efficiency with $F^-$ is likely due to competition between negatively charged fluoride ions and phosphate ions for positively charged adsorption sites on the CaAl LDO-BC surface. The impact of $HCO_3^-$ ions on P removal can be explained by its buffering effect, which raises the solution pH. Higher PH levels reduce the positive surface charge of CaAl LDO-BC, thereby decreasing electrostatic attraction between the adsorbent and the negatively charged phosphate species. Even under these conditions, the removal efficiency remained above 85%, illustrating the selectivity and efficiency of CaAl LDO-BC in P adsorption when it co-exists with different ions.

Effect of Ionic Strength

The effect of ionic strength on P removal by CaAl LDO-BC was evaluated using NaCl as the background electrolyte, with NaCl concentrations ranging from 0.001 to 1 M. The experiments were conducted at a fixed P concentration of 100 mg/L, $S_0=1$ g/L, pHi=5, $t=24$ h, at room temperature and the results are provided in FIG. 7C. The outcome demonstrated that the removal efficiency remained above 95% when the NaCl concentration was between 0.001 and 0.1 M, indicating that the presence of moderate ionic strength had minimal impact on the adsorption performance of CaAl LDO-BC. However, when the NaCl concentration increased to 1 M, the removal efficiency slightly decreased to 93.2%. This slight reduction at higher ionic strength can be attributed to the shielding effect caused by the background electrolyte. At elevated NaCl concentrations, the electrostatic interactions between the negatively charged phosphate ions and the positively charged adsorption sites on CaAl LDO-BC are partially screened by the high concentration of $Na^+$ and $Cl^-$ ions in the solution. Despite this effect, the removal efficiency of phosphate remained above 93%, underscoring the robust adsorption capacity and selectivity of CaAl LDO-BC under varying salinity conditions.

Effect of Temperature and Thermodynamic

The impact of temperature on P adsorption by the CaAl LDO-BC composite was evaluated within a temperature range of 25 to 60° C., as depicted in FIG. 7D. The reaction conditions were $[P]i=150$ mg/L, pHi=5, $So=0.5$ g/L, $t=24$ hr. A clear trend was observed, where the adsorption efficiency increased significantly from 47.6% to 80% with rising temperatures from 25 to 60° C., confirming the endothermic nature of the process. At higher temperatures, increased molecular movement and activation energy likely enhanced the interaction between P ions and the adsorption sites on the CaAl LDO-BC surface.

The thermodynamic parameters for P adsorption onto CaAl LDO-BC are summarized in Table 8. The negative $\Delta G^0$ values at all temperatures signify a spontaneous adsorption process, with spontaneity increasing as temperature rises. While the positive value of $\lambda H^0$ (20.8 kJ/mol) suggests that the adsorption process is endothermic, requiring energy input, possibly due to chemical interactions between the adsorbent and P ions. Additionally, the positive $\lambda S^0$ value (79.4 J/mol/K) reflects increased randomness at the solid-liquid interface, indicating greater disorder during the adsorption process. These results demonstrate that higher temperatures enhance P adsorption onto CaAl LDO-BC.

TABLE 8

| Thermodynamic factors for the adsorption of P by CaAl LDO-BC. | | | |
|---|---|---|---|
| Temperature (° C.) | $\Delta G^0$ (kJ/mol) | $\Delta H^0$ (kJ/mol) | $\Delta S^0$ (J/mol/K) |
| 25 | −2.897 | 20.8 | 79.4 |
| 35 | −3.713 | | |
| 45 | −4.203 | | |
| 60 | −5.757 | | |

Adsorption Isotherm

The equilibrium experimental data for P adsorption were analyzed for CaAl LDO-BC and BC@CaAl LDO composites using nonlinear fitting of Langmuir, Freundlich, Redlich-Peterson (R-P), Tamkin, and Sips models. The fitted isotherm curves are presented in FIGS. 8A and 8B, while the corresponding isotherm parameters and statistical coefficients are summarized in Table 6. For CaAl LDO-BC (FIG. 8A), the Sips model provided the best fit, with the highest $R^2$ value (0.967) and the lowest SSE (1086.7), indicating that P adsorption involves a monolayer mechanism with homogenous and heterogenous surfaces. The Langmuir model also performed well, presenting an $R^2$ value of 0.939, suggesting a monolayer adsorption process. The maximum Langmuir adsorption capacity was 222.5 mg/g. The Langmuir separation factor ($R_L$) was calculated, and values were in a range of 0.02 to 0.01 which indicates that the uptake process of P ions is favorable. The R-P model demonstrated a slightly better fit than Langmuir ($R^2$=0.951 and SSE=1198.6), reflecting the potential of having both heterogenous and homogenous active sites on the CaAl LDO-BC surface.

For BC@CaAl LDO, the Langmuir model achieved a maximum adsorption capacity of 88.4 mg/g with an $R^2$ of 0.649 and an $R_L$ values ranging between 0.04 to 0.01, indicating the presence of monolayer adsorption and emphasizing the favorability of P adsorption. In comparison, the Freundlich model displayed a significantly lower $R^2$ value (0.357), suggesting minimal multilayer adsorption. The R-P and Sips models showed moderate fits for BC@CaAl LDO, with $R^2$ values of 0.698 and 0.668, respectively, highlighting a combination of heterogeneous and homogenous adsorption behaviors. Overall, CaAl LDO-BC exhibited superior adsorption performance compared to BC@CaAl LDO, with higher adsorption capacity and better fit to all tested isotherm models. These findings highlight the potential of CaAl LDO-BC as a superior adsorbent for P removal.

Adsorption Kinetics

Figures 9A, 9B, 9C, 9D:
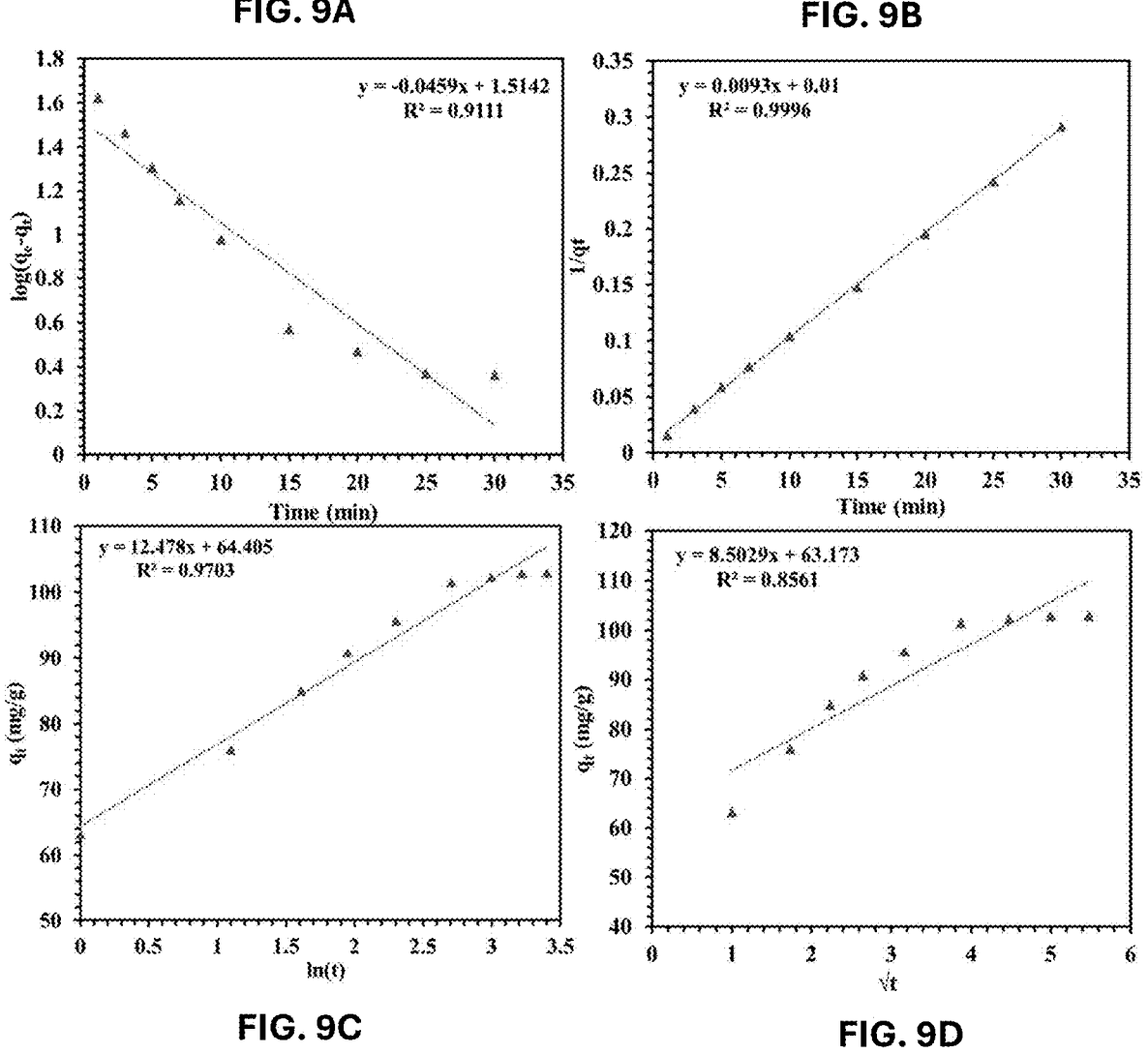
FIG. 9 illustrates Linearized kinetic models of PFO in FIG. 9A, PSO in FIG. 9B, Elovich in FIG. 9C, and Intraparticle diffusion for P adsorption onto CaAl LDO-BC composite in FIG. 9D.

The kinetics of P adsorption onto CaAl LDO-BC were investigated to determine the adsorption rate, equilibrium time, and underlying mechanisms. Experimental data were fitted into four kinetic models: pseudo-first-order (PFO), pseudo-second-order (PSO), Elovich, and intraparticle diffusion. The best-fit trend lines are shown in FIG. 9, and Table 7 presents the kinetic parameters and their coefficients of determination. The PFO model exhibited an $R^2$ value of 0.911, but its theoretical adsorption capacity (32.7 mg/g) deviated significantly from the experimental capacity (102.9 mg/g), indicating a poor fit. Conversely, the PSO model showed the highest $R^2$ value (0.999), and its calculated adsorption capacity (107.5 mg/g) was in close agreement with the experimental value, suggesting that the adsorption process is primarily controlled by chemisorption such as ion exchange between the adsorbent and phosphate ions. The Elovich model also displayed a strong fit ($R^2$=0.970), implying a chemisorption mechanism and the presence of a heterogeneous surface, consistent with the isotherm analysis. Meanwhile, the intraparticle diffusion model yielded a lower $R^2$ value (0.856), indicating that while intraparticle diffusion contributes to the adsorption process, it is not the only rate-limiting step. These results collectively suggest that the adsorption of P onto CaAl LDO-BC is predominantly governed by chemisorption, with additional contributions from surface and intraparticle diffusion processes.

TABLE 7

| Kinetic models' parameters and their corresponding coefficients of determination using CaAl LDO-BC composite. | | |
|---|---|---|
| Kinetic models | Parameters | Value |
| PFO | $q_e$ (mg/g) | 32.7 |
| | $k_1$ (min−1) | 0.11 |
| | $R^2$ | 0.911 |
| PSO | $q_e$ (mg/g) | 107.5 |
| | $k_2$ (g/mg/min) | 0.01 |
| | $R^2$ | 0.999 |
| Elovich | $\beta$ (g/mg) | 0.08 |
| | $\alpha$ (mg/g/min) | 2176.5 |
| | $R^2$ | 0.970 |
| Intraparticle Diffusion | c (mg/g) | 63.2 |
| | $K_{diff}$ (mg/g/min$^{-0.5}$) | 8.5 |
| | $R^2$ | 0.856 |

Wastewater Treatment

To evaluate the performance of CaAl LDO-BC and BC@CaAl LDO for remediating P⁻ contaminated wastewa-

TABLE 6

| Adsorption isotherm parameters for CaAl LDO-BC and BC@CaAl LDO composites and their corresponding statistical coefficients. | | | | | | | | | |
|---|---|---|---|---|---|---|---|---|---|
| Isotherm models | Langmuir | | Freundlich | | R-P | | Tamkin | | Sips | |
| CaAl | $X_m$ | 222.5 | n | 6.51 | $K_r$ | 64.9 | $A_t$ | 25.5 | $Q_s$ | 207.9 |
| LDO-BC | $K_L$ | 0.39 | $K_F$ | 105.9 | n | 1.1 | b | 87.6 | $K_s$ | 0.1 |
| | $R^2$ | 0.939 | $R^2$ | 0.741 | $b_r$ | 0.2 | $R^2$ | 0.798 | $n_s$ | 2.2 |
| | SSE | 1378.1 | SSE | 4247.5 | R2 | 0.951 | SSE | 3741.3 | $R^2$ | 0.967 |
| | | | | | SSE | 1198.6 | | | SSE | 1086.7 |
| BC@CaAl | $X_m$ | 88.4 | n | 11.1 | $K_r$ | 42.6 | $A_r$ | 464.8 | $Q_s$ | 86.1 |
| LDO | $K_L$ | 0.48 | $K_F$ | 56.5 | n | 1.1 | b | 305 | $K_s$ | 0.2 |
| | $R^2$ | 0.649 | $R^2$ | 0.357 | $b_r$ | 0.4 | $R^2$ | 0.409 | $n_s$ | 1.8 |
| | SSE | 763.2 | SSE | 1404.4 | R2 | 0.698 | SSE | 1284.9 | $R^2$ | 0.668 |
| | | | | | SSE | 700.8 | | | SSE | 721.8 | ter, 10 L of wastewater was collected from a local food industry in Al Thaid, UAE, and subjected to adsorption experiments. The reaction conditions are [P]i=174.2 mg/L, pHi=7.6, So=1.5 g/L, t=1 h, and at room temperature. The general water characterization results are presented in Table 8. The results, summarized in FIG. 10A and Table 8, reveal a significant reduction in P levels after treatment. CaAl LDO-BC demonstrated exceptional removal efficiency of up to 93%. In comparison, BC@CaAl LDO showed a lower performance with 59%. Additionally, negligible changes were observed for $SO_4^{2-}$, $NO_3^-$, and Cl levels, indicating the strong selectivity of CaAl LDO-BC towards P ions. Notably, the presence of $Cl^-$, at twice the concentration of P, did not hinder the adsorption performance of the material, which was confirmed by the effect of ionic strength (FIG. 7C). These findings highlight CaAl LDO-BC as a highly effective and selective adsorbent for P remediation, particularly in contaminated wastewater and saline water systems.

TABLE 8

General characterization of wastewater sample from Al Thaid, UAE before and after remediation using CaAl LDO-BC and BC@CaAl LDO. Composites' dosage is 1.5 g/L, initial pH 7.6, and 1 h contact time.

| | | After treatment | |
| Parameter | Raw wastewater | CaAl LDO-BC | BC@CaAl LDO |
| --- | --- | --- | --- |
| pH | 7.6 | 8.7 | 8 |
| Electrical conductivity-EC (µS/cm) | 1779 | 2070 | 2230 |
| Total dissolved solids- TDS (mg/L) | 1053 | 1430 | 1580 |
| $PO_4^{3-}$ (mg/L) | 174.2 | 12.2 | 71.5 |
| $SO_4^{2-}$ (mg/L) | 98.7 | 97.2 | 99.36 |
| $NO_3^-$ | 105.7 | 111.6 | 113.4 |
| $Cl^-$ (mg/L) | 414.8 | 436.6 | 436.2 |

Effect of CaAl LDO-BC Dosage

The influence of CaAl LDO-BC dosage on P removal from contaminated wastewater was examined by varying the dosage between 0.25 g/L and 1.5 g/L, as shown in FIG. 10B. The reaction temperature are: [P]i=174.2 mg/L, pHi=7.6, t=24 h, and at room temperature. The results demonstrated a substantial improvement in P removal efficiency, rising from 50.6% to 88.2% as the dosage increased from 0.25 g/L to 0.75 g/L. A further increase in dosage to 1.25 g/L enhanced the efficiency to 90.9%, while a slight improvement was observed at 1.5 g/L, achieving a maximum removal efficiency of 99.9%. This notable enhancement in P uptake was linked to the greater availability of active adsorption sites provided by higher dosages relative to the fixed P concentration. To ensure efficient material usage and maintain high removal efficiency, a CaAl LDO-BC dosage of 0.75 g/L was identified as the optimal dosage.

Mechanism of Adsorption of Phoshates "P"

Figure 11B:
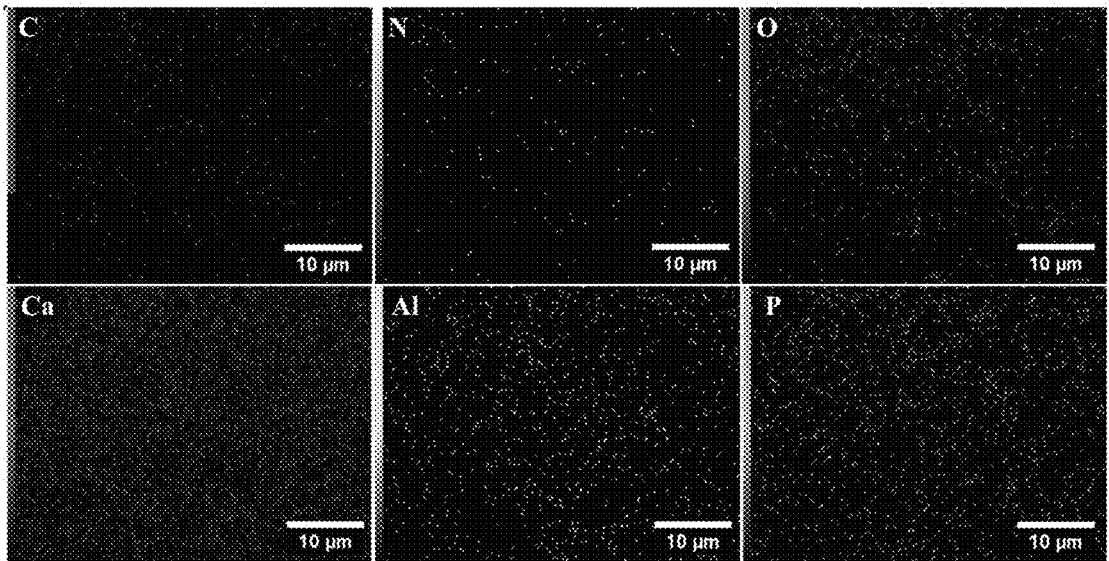

To understand the possible adsorption mechanisms of P onto CaAl LDO-BC composite, FTIR, XRD, SEM-EDS, and XPS analyses were employed. FIG. 5B depicts the FTIR spectra of pristine CaAl LDO-BC and loaded CaAl LDO—BC—P. After P adsorption, changes were observed in the spectrum including a reduction in O—H band intensity and shifting to 3453 $cm^{-1}$. This indicates the involvement of hydroxyl groups in the adsorption process by either replacing with phosphate ions forming inner-sphere complexes (M-O—P) or through the formation of outer-sphere complexes via electrostatic attraction. Simultaneously, the band at 1420 $cm^{-1}$ weakened after adsorption with a slight shifting to 1427 $cm^{-1}$ indicating that $NO_3^-$ participated in P adsorption through interlayer ion exchange (intercalation). While the peak at 1025 $cm^{-1}$ corresponded to the P—O stretching vibration of $H_2PO_4$ or $HPO_4^{2-}$ intensified, confirming the successful capture of phosphate ions by the CaAl LDO-BC adsorbent. Below 1000 $cm^{-1}$, the peaks exhibited an increased intensity, indicating strong interactions between P and the metal oxide functional groups. This indicates the formation of inner/outer-sphere surface complexes. In FIG. 5C, the XRD pattern of CaAl LDO-BC after P adsorption revealed the formation of amorphous calcium phosphate ($Ca_2P_2O_7$) at a 2θ value of 29°. This amorphous phase acts as a transitional precursor for the formation of hydroxyapatite (HAp), a stable and crystalline calcium phosphate mineral. The presence of this intermediate phase strongly supports the occurrence of a surface complexation mechanism, where inner-sphere complexes are formed through direct chemical bonding between phosphate ions and the active sites on the CaAl LDO-BC surface, as confirmed by the FTIR results. Additionally, the SEM micrographs, presented in FIG. 11A, revealed no significant changes in the material's structural morphology after adsorption, with the layered and flake-like structures of CaAl LDO-BC remaining intact. The EDX mapping (FIG. 11B) confirmed the presence of phosphate ions across the material's surface, signifying successful adsorption without compromising the structural integrity of the adsorbent.

Figure 12:
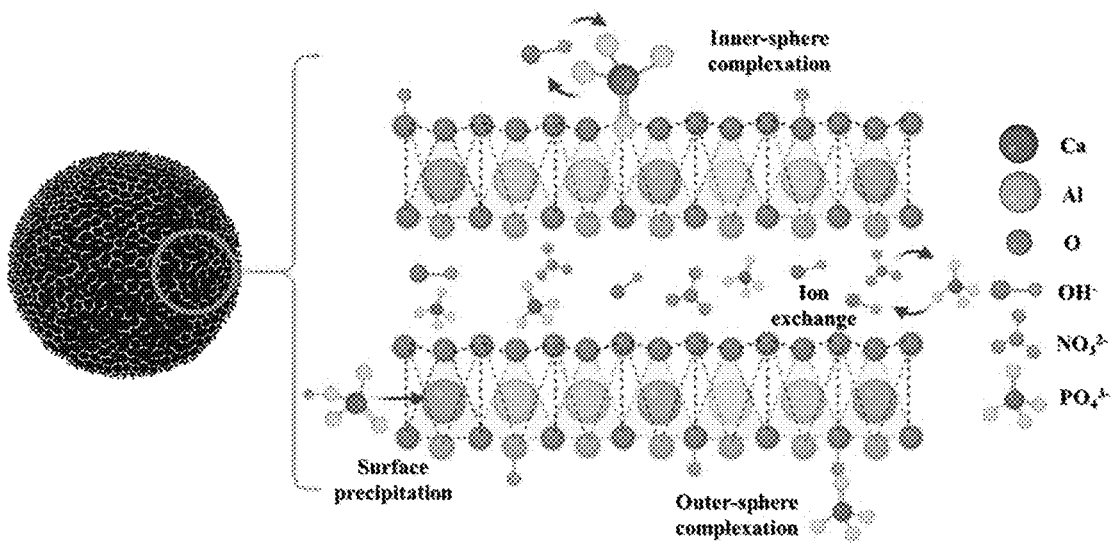
FIG. 12. Schematic diagram on P adsorption mechanisms using CaAl LDO-BC composite.

It may be evident that the adsorption of phosphate onto CaAl LDO-BC involved inner-sphere complexation (ligand exchange), outer-sphere complexation (electrostatic interactions), interlayer ion exchange, and surface precipitation mechanisms, as summarized in FIG. 12. It may be suggested that at the initial stage, adsorption occurred, involving electrostatic adsorption and interlayer ion exchange. These mechanisms led to a high release of $OH^-$ group causing an increase in solution pH, as depicted previously in FIG. 7A. After this stage, slow adsorption is suggested to occur where $H_2PO_4$ and $HPO_4^{2-}$ species are adsorbed forming monodentate or bidentate inner-sphere complexes such as HAp and Al—P (AlPO4) complexes.

The advantages of the doped biochar composite include:

Easy manufacturing process—The process of preparing the doped biochar composite either by co-pyrolysis method or two-step method is an easy process and is scalable.

Recycling of waste product—The method uses a waste product, a pomace, for preparing a composite for remove the impurities from wastewater. This helps in reducing the environmental burden generated by high amount of pomace generated.

Water reclamation—The increase in phosphate in water causes eutrophication which leads to oxygen depletion in water thereby causing a detrimental effect on the aquatic environment. The doped biochar composite of the invention enables removal of phosphates from wastewater up to 98%, which enable improving the quality of water.

Water purification—The doped biochar composite of the invention may be used in the water purification process to reduce the quantity of phosphates in water.

Agriculture-End product after phosphorous adsorption used as fertilizer. Once the doped biochar has been used in water purification, the phosphorous-adsorbed doped biochar composite may be used as a fertilizer for increasing the phosphorous content of the soil. This reduces the dependence of chemical fertilizers on agriculture.

The invention described herein is susceptible to variations, modifications, and/or additions other than those specifically described and it is to be understood that the invention includes all such variations, modifications and/or additional which fall within the scope of the following claims.

The invention claimed is:

1. A method of preparing a Calcium-Aluminium-layered double oxide (CaAl-LDO)-doped biochar composite, the method comprising:

providing a solution containing calcium nitrate and aluminium nitrate, providing an un-pyrolyzed pomace, providing an alkaline solution, mixing the un-pyrolyzed pomace, the alkaline solution, and the solution containing calcium nitrate and aluminium nitrate, thereby to form a precipitate Calcium-Aluminium-layered double hydroxide (CaAL-LDH) on the pomace, pyrolyzing or calcinating the mixture to prepare CaAL LDO-doped biochar composite.

2. The method of claim 1 wherein a molar ratio of calcium nitrate to aluminium nitrate is 3:1.

3. The method of claim 1 wherein the step of pyrolyzing or calcinating the mixture is conducted in an inert atmosphere.

4. The method of claim 1 further comprises separating the solution from the precipitate Calcium-Aluminium-layered double hydroxide (CaAL-LDH) on the un-pyrolyzed pomace before pyrolyzing or calcinating the precipitate Calcium-Aluminium-layered double hydroxide (CaAL-LDH) on the un-pyrolyzed pomace to form the CaAL LDO-doped biochar composite.

5. The method of claim 1 wherein the un-pyrolyzed pomace is selected from at least one of olive, grapes, peanut, coconut, and palm.

6. The method of claim 1 wherein the alkaline solution is a Sodium Hydroxide solution.

7. The method of claim 1 wherein a phosphate adsorption efficiency is the region of about 87% to about 98%.

8. A method of removing impurities from water comprises:

providing a Calcium-Aluminium-layered double oxide (CaAl-LDO)-doped biochar composite as claimed in claim 1;

contacting the Calcium-Aluminium-layered double oxide (CaAl-LDO)-doped biochar composite with water, for absorbing impurities in the water.

9. The method of claim 8 wherein the impurities are phosphate-based impurities.

10. The method of claim 9 wherein the CaAl-LDO adsorbs the phosphate-based impurities in the range of from 43% to about 98%.

11. The method of claim 8 wherein the water is selected from any of usable water and wastewater.

* * * * *